Aug. 22, 1961 W. B. WESTCOTT, JR 2,997,261
LANDING GEAR
Filed July 7, 1958 3 Sheets-Sheet 1
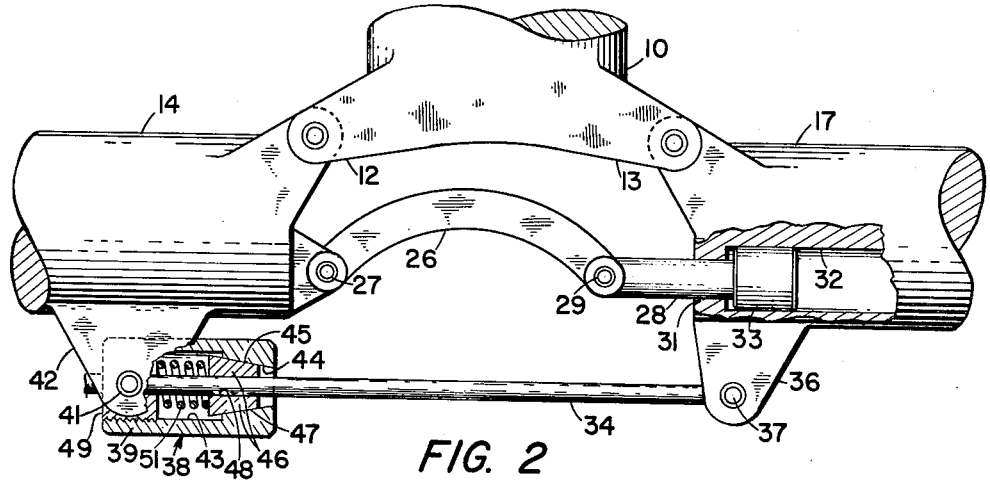
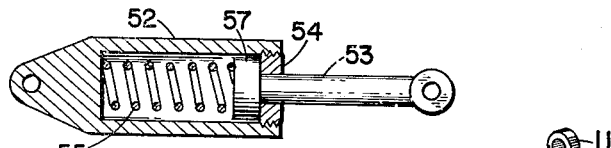
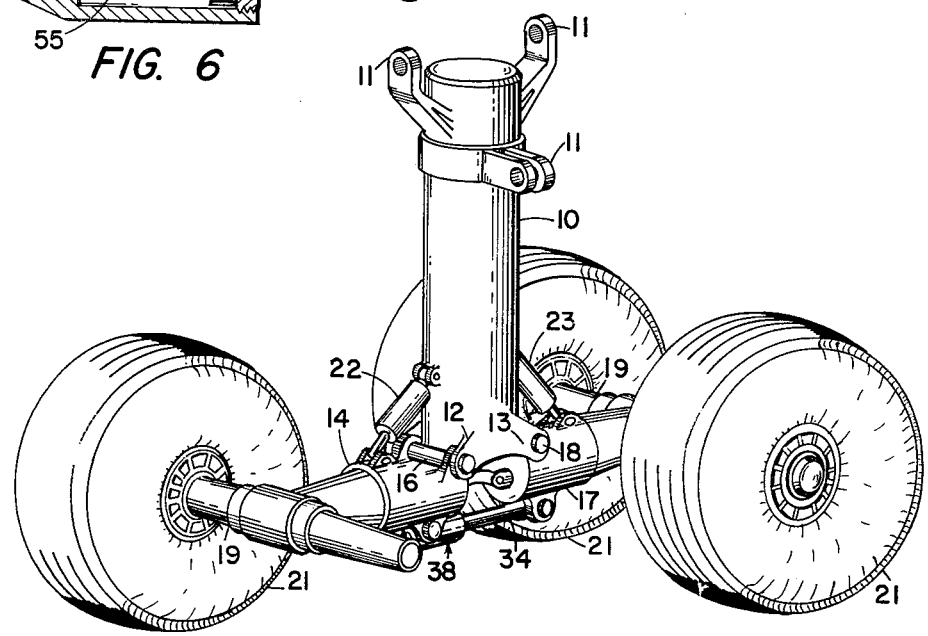
INVENTOR.
WILLIAM B. WESTCOTT, JR.
BY
ATTORNEY Aug. 22, 1961 W. B. WESTCOTT, JR 2,997,261
LANDING GEAR
Filed July 7, 1958 3 Sheets-Sheet 2

INVENTOR.
WILLIAM B. WESTCOTT, JR.
BY
ATTORNEY

Aug. 22, 1961   W. B. WESTCOTT, JR   2,997,261
LANDING GEAR

Filed July 7, 1958   3 Sheets-Sheet 3

INVENTOR.
WILLIAM B. WESTCOTT, JR.
BY
ATTORNEY

United States Patent Office 2,997,261
Patented Aug. 22, 1961

2,997,261
LANDING GEAR
William B. Westcott, Jr., Cleveland Heights, Ohio, assignor to Cleveland Pneumatic Industries, Inc., Cleveland, Ohio, a corporation of Ohio
Filed July 7, 1958, Ser. No. 747,032
19 Claims. (Cl. 244—103)

This invention relates generally to landing gears and more particularly to a new and improved landing gear suitable for use in high temperature installations.

In high speed aircraft, the temperatures in the airframe are high due to friction and the like so various components require cooling to prevent their failure, which cooling requirement must be minimized if the aircraft performance is to increase. In the past, it has been customary to utilize hydraulic fluids in the aircraft landing gear shock absorber and spring. Such hydraulic fluids and the seals used to contain them break down and deteriorate at elevated temperatures and limit the temperature to which the landing gear can be exposed. In a landing gear according to this invention, the spring and shock absorbing functions are performed by non-fluid devices which are capable of operating at high temperatures in excess of 1000° F. so a landing gear according to this invention does not require cooling.

It is an important object of this invention to provide a landing gear incorporating shock absorbing and spring means which can operate or be stored in a very high temperature environment.

It is another object of this invention to provide a landing gear shock absorber which is completely metallic in its structure.

It is still another object of this invention to provide a landing gear shock absorber which utilizes an element deformed beyond its elastic limit to absorb without storing energy.

It is still another object of this invention to provide an aircraft landing gear shock absorber wherein a metallic bar is stretched beyond its elastic limit to absorb without storing energy.

Further objects and advantages will appear from the following description and drawings, wherein:

FIGURE 1 is a prospective view with some parts removed for purposes of clarity, illustrating a typical landing gear incorporating this invention;

FIGURE 2 is an enlarged fragmentary view partially in section showing the structural details of the spring and shock absorber suspension;

FIGURE 6 is a longitudinal section showing the structure of the bungee springs used to locate the axle beam while the aircraft is air-borne;

Figure 3:
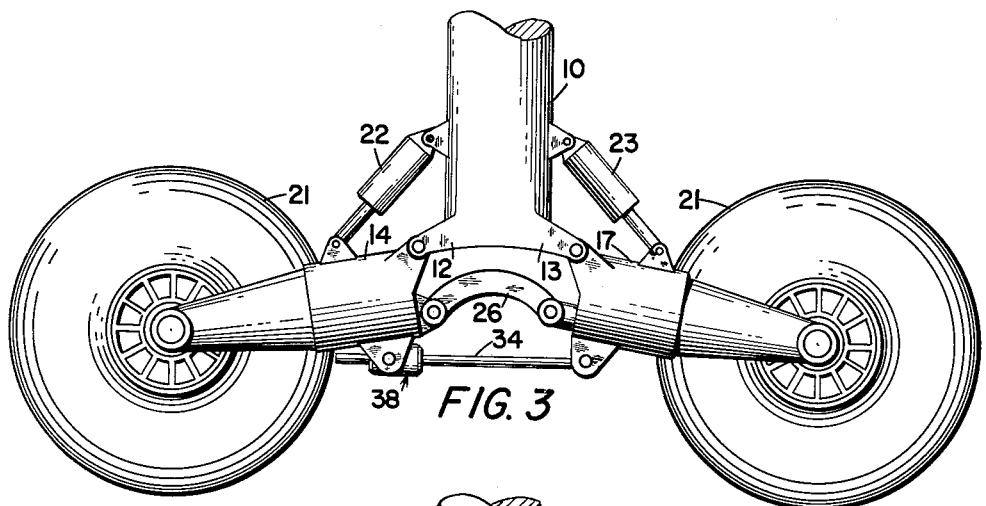
FIGURE 3 is a side elevation partially in section showing the elements in the extended position which they assume when the landing gear is air-borne and is not supporting any weight.

Referring to the drawings. The first embodiment of an aircraft landing gear incorporating this invention is shown in FIGURES 1 through 5. In this embodiment, a tubular strut 10 is formed with mounting lugs 11 adapted to attach the strut to the frame of an aircraft (not shown). The lower end of the strut 10 is formed with a forward pair of laterally extending lugs 12 and a similar rearward pair of lugs 13. A forward axle beam 14 is pivotally connected on the forward lugs 12 by a pivot pin 16 so that the forward axle beam 14 can rotate around the pivot pin 16 in a vertical plane. Similarly, a rearward axle beam 17 is pivoted on the rearward lugs 13 by a pivot pin 18 for rotation relative to the strut in the same vertical plane. Each of the axle beams 14 and 17 is formed with a laterally extending axle 19 at the outer ends thereof on which are journalled landing wheels 21. In FIGURE 1, one of the wheels on the forward axle beam 14 has been removed so that the structure of the strut can be illustrated but it should be understood that there are a forward pair of dual wheels and a rearward pair of dual wheels on the landing gear.

Figure 4:
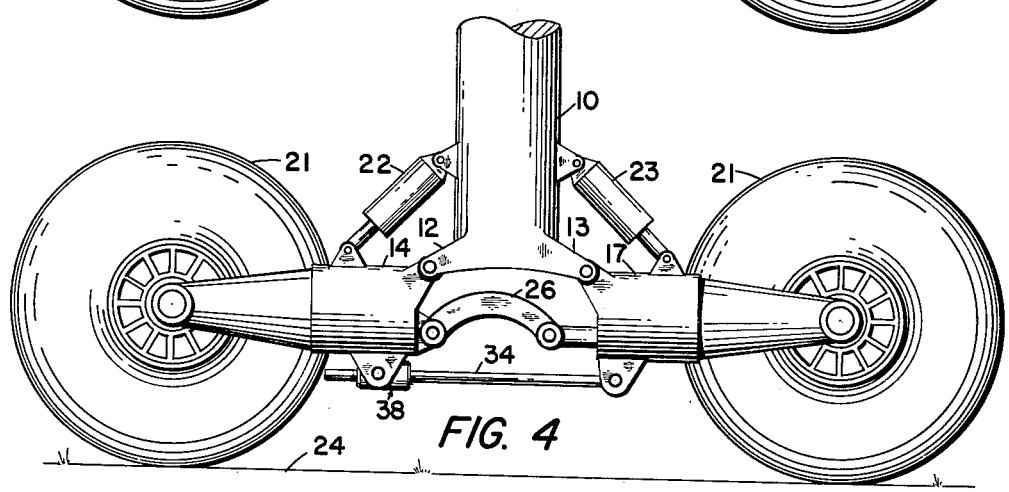
FIGURE 4 is a view similar to FIGURE 3 showing the position the elements assume when the landing gear is in the static position supporting the weight of the aircraft on the ground.
Figure 5:
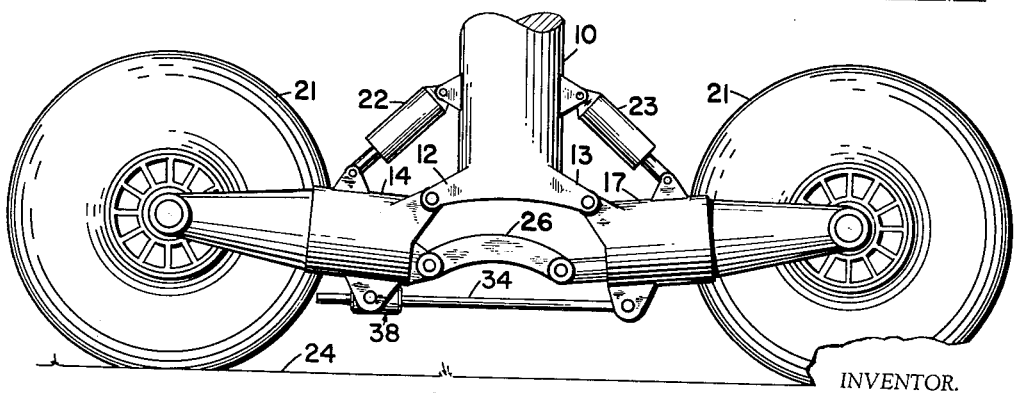
FIGURE 5 is a view similar to FIGURES 3 and 4 showing the position the elements assume when the landing gear is in the fully compressed position which may occur during the impact of landing.
Figure 7:
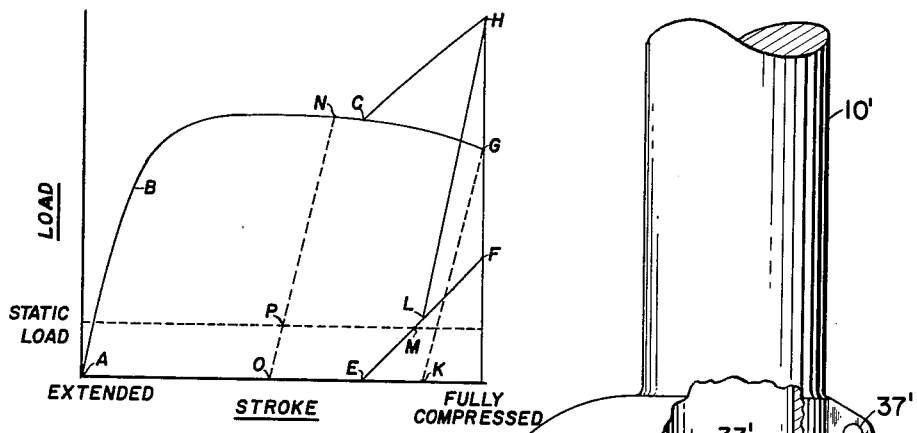
FIGURE 7 is a load stroke diagram illustrating the landing gear operation.

Referring now to FIGURES 3 through 5. A pair of bungee springs 22 and 23 are pivotally connected between the strut 10 and the axle beams 14 and 17 respectively. When the aircraft is air-borne, the two axle beams 14 and 17 assume the position shown in FIGURE 3 wherein the bungee springs 22 and 23 prevent further movement of the axle beams 14 and 17 respectively in a downward direction by bottoming out and act to hold the axle beams in this position by a spring action which will be described below. When the aircraft lands and the wheels 21 engage the ground, shown schematically at 24, an upward reaction is produced on the wheels which causes the forward axle beam 14 to rotate in a clockwise direction relative to the strut 10 and a rearward axle beam 17 to rotate in a counterclockwise direction. The two bungee springs 22 and 23 are sized so that their reaction is insignificant when considering the loads of the aircraft. The various elements are proportioned so that when the aircraft is on the ground with the landing gear supporting just the static weight of the aircraft, the elements assume the position substantially as shown in FIGURE 4 which is the static position but the elements are arranged so that they can assume the fully compressed position of FIGURE 5 at the point of impact.

To resist relative rotation between the two axle beams 14 and 17 so that the aircraft will be resiliently supported on the ground and the energy of impact will be absorbed during the landing, a mechanical springing and shock absorbing mechanism, best illustrated in FIGURE 2, is utilized. This mechanism includes a heavy arch type mechanical spring 26 pivoted on one end to the forward axle beam 14 by a pivot pin 27 and at its other end to a plunger 28 by a pivot pin 29. The plunger 28 extends through an apertured end wall 31 into a bore 32 formed in the rearward axle beam 17. A head 33 is formed on the plunger 28 and is adapted to engage the end wall 31 to resist movement of the plunger 28 to the left beyond the position of engagement while permitting the plunger 28 to move to the right relative to the rearward axle beam 17 from this engagement position. Thus, the spring 26 cannot be compressed by rotation of the two axle beams 14 and 17 downwardly which rotation tends to move the lower portions of the opposing faces thereof toward each other but does operate to place the spring 26 in tension upon movement of the two axle beams 14 and 17 in an upward direction beyond a predetermined position relative to the strut 10.

The spring and shock absorbing mechanism also includes a tension rod 34 pivotally connected at one end by a pin 37 to a depending lug 36 formed on the rearward axle beam 17. The opposite end of the tension rod 34 extends into a clamping assembly 38 which includes a housing 39 pivotally connected by a pair of pins 41, only one of which appears in FIGURE 2, to depending lugs 42 formed on the forward axle beam 14 and proportioned to embrace the housing 39. The housing 39 is formed with an axial bore 43 terminating at its right end in a conical surface 44. A pair of opposed wedge blocks 46 are formed with mating external conical surfaces 47 which engage the conical surface 44 and an internal cylindrical surface 48 which engages the tension rod 34. The two conical surfaces 44 and 47 are formed with locking angles so the clamping assembly 38 functions to permit movement of the rod 34 to the left into the assembly but automatically clamps against the tension rod 34 and prevents movement thereof at the right out of the clamping assembly. A spring 51 is positioned between a retainer 49 threaded into the housing 39 and the wedge blocks 46 and resiliently maintain them in position for clamping. This structure prevents the tension rod 34 from being placed in compression but operates to place the tension rod 34 in tension whenever the two pivot pins 37 and 41 are caused to be moved apart by rotation of the two axle beams 14 and 17 relative to the strut 10 in an upward direction. To prevent excessive bending in the tension rod, the axis of the pins 41 are arranged to intersect the axis of the tension rod 34 and the clamping engagement of the wedge blocks 46 is located to the right of the pins 41.

The structure of the two bungee springs 22 and 23 is identical so only one will be described in detail with the understanding that the described structure applies to both. Referring to FIGURE 6, the bungee 23 includes a cylinder 52 into which projects a plunger 53. An apertured collar 54, through which the plunger 53 projects, is threaded into the open end of the cylinder 52 to provide a stop against which a head 53 on the plunger is seated or bottomed when the bungee is in the fully extended position. A coil spring 55 extends between the head 53 and an end wall 56 in the cylinder 52 and resiliently urges the plunger to its extended position. The spring 55 is sized so that it provides a sufficient force to maintain the associated axle beam in its extended position even when the landing gear is retracted but its action is not significant in the ground operation of the aircraft.

Referring now to FIGURES 3 through 5 and 7. When the aircraft is air-borne prior to landing, the elements assume the extended position. At this time, the tension rod 34 is automatically clamped to resist any upward movement of the axle beams 14 and 17 relative to the strut. Upon landing, when the wheels 21 engage the ground, they produce rotation of the forward axle beam 14 in a clockwise direction relative to the strut 10 and rotation of the axle beam 17 in a counterclockwise direction relative to the strut 10 causing the depending lugs 36 and 42 to move apart, placing the tension rod 34 in tension. The initial portion of the upward movement caused by the engagement of the wheels 21 with the ground stretches the tension rod 34 within its elastic limit along the curve of FIGURE 7 between the points A and B. Continued stretching of the tension rod causes it to be deformed beyond its elastic limit along the curve from B to C. Those skilled in the art will recognize that deformation of the rod beyond the elastic limit produces an absorption of energy by permanent deformation which energy is not returned when the load is released from the rod. The various elements are proportioned so that when the point C is reached, the head 33, shown in FIGURE 2, engages the end wall 31 and initiates loading of the spring 26. The loading of the spring 26 is represented on the load stroke diagram of FIGURE 7 between the points E and F and is designed to be within the elastic limit of the spring 26. As the strut moves beyond the stroke position of the point C toward the fully compressed position, the effect of the continued stretching of the tension rod 34 is illustrated by the curve from C to G and this adds to the action of the spring 26 to produce a total resistance to the landing gear compression represented by the curve from C to H. The area beneath the curve ABCH represents the energy absorbed by the landing gear in movement from the extended position of FIGURE 3 to the fully compressed position of FIGURE 5. As the landing gear returns to the static position, the two spring elements, namely the spring 26 and the tension rod 34, return some of the energy. The actual energy return or spring action as the load is relieved from the tension rod 34 is represented by the dotted line from G to K which is substantially parallel to the line AB. Because the spring 26 is not stressed beyond its elastic limit, unloading of this spring causes the load stroke relationship to return along the line FE. The two act together to cause a total delivery force along the line HL. At the point L, the tension is completely relieved from the tension rod 34. Since the static position of the aircraft is not reached when the tension rod 34 is relieved of tension, the spring 26 assumes the entire load and causes the landing gear to move to the static position, on the line EF.

When the vertical velocity of a landing is low, the dynamic load on the landing gear is not the maximum load which the landing gear can absorb, described above. Assuming that the landing is such that the impact load is completely absorbed when the tension rod has been stretched from A through B to N, then the tension rod 34 will spring back along the line NO which is substantially parallel to the line AB until the static load of the aircraft is supported in a position illustrated at P. In such a case, the spring 26 would not come into play during the landing and the static load of the aircraft would be supported by the tension rod 34.

Those skilled in the art will recognize that because the tension rod 34 is stretched beyond its elastic limit, it must be replaced after a landing. It is, therefore, necessary to remove the tension rod and replace it with a new rod each time the aircraft lands. If a light landing has been made and the elements are in the static position illustrated at P, cutting of the tension rod 34 will drop the aircraft down until the load is picked up by the spring 26. At this time, a new tension rod is inserted and the spring 26 will support the aircraft while it is on the ground and during the taxi and take-off run. Once it is again air-borne, the clamping assembly 38 operates to again clamp the rod 34 in the fully extended position. The rod 34 should be sized so that it extends through the clamping assembly 38 when the landing gear is in the static position prior to take-off. When the load is removed from the landing gear at take-off, the axle beams 14 and 17 move to the extended position and the tension rod 34 slides to the left through the clamping assembly 38 until the elements are in the extended position of FIGURE 3. The clamping assembly 38 then automatically grips the tension rod and the landing gear is ready for a landing impact.

In some cases, it may be desirable to size the tension rod 34 so that more than one landing can be absorbed with the absorption capability of the tension rod, or it may be desirable to provide a plurality of tension rods which are used sequentially so that more than one landing can be made without replacing the tension rods. When this is done, means are provided to prevent the clamping assembly for a given bar from clamping its bar. These means can be manually controlled by the pilot of the aircraft to sequentially use the bars or automatic control can be provided.

Because the shock absorbing system does not utilize fluids or fluid seals but rather depends upon the non-elastic deformation of metal, it is possible to provide a landing gear which is able to operate in temperatures in excess of 1,000° F. This is a greatly increased temperature capability when comparing the device with the usual hydraulic shock absorbers. In addition, the weight of the mechanism is greatly reduced because the unit loading of a metallic bar in tension can be very high when comparing it with the operating pressures of a hydraulic system.

Figure 8:
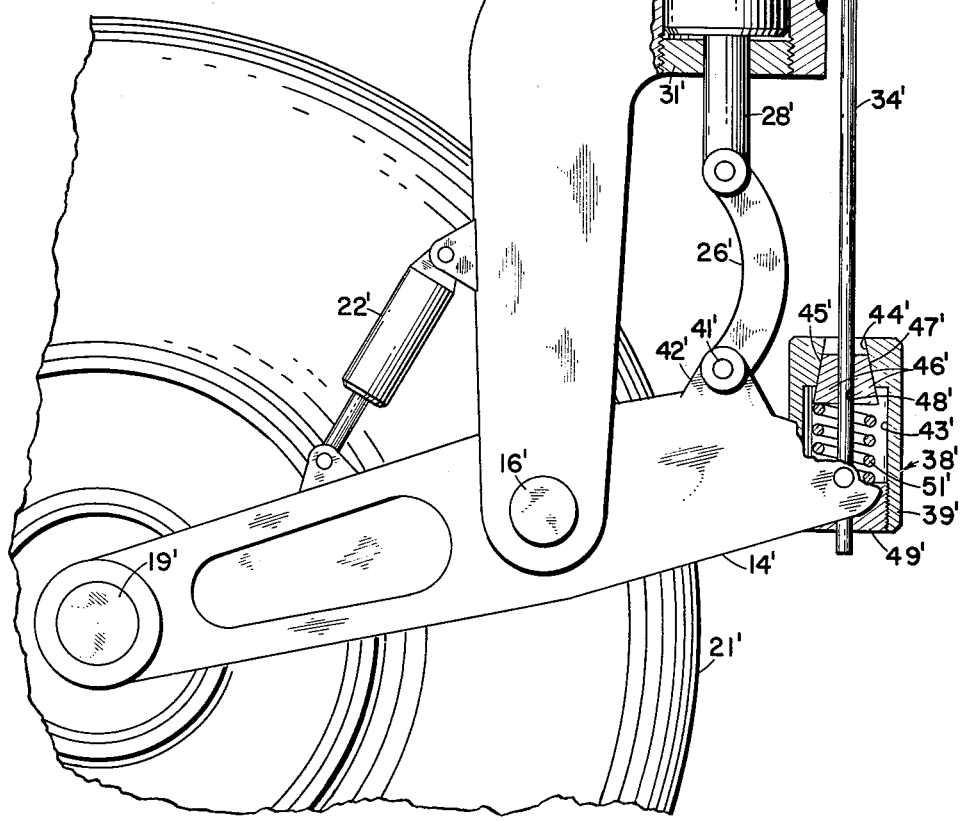
FIGURE 8 is a side elevation partially in section of a second embodiment of this invention.

Referring now to FIGURE 8. A second embodiment of this invention is illustrated wherein the landing gear includes a single or dual wheel arrangement rather than the tandem dual wheel arrangement of the first embodiment. In this embodiment, similar reference numerals are used for corresponding elements but a prime (') is added to indicate that they refer to the second embodiment. In this embodiment, the strut 10' is provided with an articulated axle beam 14' pivoted for rotation around a pivot pin 16'. A landing wheel 21' is journalled on an axle 19' to one end of the axle beam 14' so that rotation of the axle beam 14' in a clockwise direction causes the wheel 21' to move upwardly relative to the strut 10'. A single bungee spring 22' is connected between the axle beam 14' and the strut 10' to the left of the pivot pin 16' to prevent movement of the axle beam in a counter-clockwise direction beyond the extended position shown and to resiliently maintain the axle beam to this position. In this embodiment, since there is only one axle beam, the spring 26' is connected to the axle beam 14' to the right of the pivot pin 16' and to the strut 10'. Also, the clamping assembly 38' is located at the right end of the axle beam 14' and the tension rod 34' is pivoted on the strut 10' by a pivot pin 37'. The connection of the spring 26' to the strut 10' includes a plunger 28' with a head 33' which engages an end member 31' to prevent the spring 26' from being placed in compression while permitting its tension loading. The operation of a strut according to this embodiment is functionally identical to the first embodiment excepting that the spring reaction forces operate between the axle beam 14' and the strut 10' to resist clockwise rotation of the axle beam.

It should be noted that in both embodiments the tension rods operate with a mechanical disadvantage in that the wheels move through a greater distance than the axial stretching of the rod. By using such a structure wherein the tension rod pivots on the axle beams are spaced from the associated axle beam pivots by a distance less than the displacement between the axle beam pivot and the wheels, it is possible to use a relatively short tension rod because the strain per unit of rod length is less than it would be if the tension rod were elongated by a length equal to or greater than the corresponding wheel displacement.

In both of the illustrated embodiments, energy is absorbed by permanently deforming the tension rod beyond its elastic limit in tension. It should be understood that other methods of producing permanent deformation, such as bending, forging, or shearing, could be used. In all cases, it is necessary to deform the deformable member in such a way that the kinetic energy is absorbed without converting it to potential energy of elastic deformation which would cause excessive rebound.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A landing gear comprising first and second elements connected for movement relative to each other between an extended position and a withdrawn position, a ground engaging wheel on at least one of said elements, and a deformable means operatively associated with said elements to permit movement of said first and second elements from said withdrawn position to said extended position without deformation of said deformable means and to permanently deform said deformable means by movement of said elements from said extended position to said withdrawn position.

2. A landing gear comprising first and second elements connected for movement relative to each other between an extended position and a withdrawn position, a ground engaging wheel on at least one of said elements, a deformable member operatively associated with said elements to permit movement of said first and second elements from said withdrawn position to said extended position without deformation of said deformable member and to permanently deform said deformable member by movement of said elements from said extended position to said compressed position, and a spring connected between said elements resiliently resisting movement thereof to said withdrawn position.

3. A landing gear comprising a strut, first and second elements connected to said strut for movement relative thereto between an extended position and a withdrawn position, a ground engaging wheel on each of said elements, a deformable member operatively associated with said elements to permit movement of said first and second elements from said withdrawn position to said extended position without deformation of said deformable member and to permanently deform said deformable member by movement of said elements from said extended position to said withdrawn position.

4. A landing gear comprising first and second elements connected for movement relative to each other between an extended position and a withdrawn position, a ground engaging wheel on at least one of said elements, a permanently deformable member connected between said elements at spaced points, said member being substantially unstressed when said elements are in said extended position, means permitting movement of said elements from said withdrawn position to said extended position without deformation of said deformable member and movement of said elements from said extended position toward said withdrawn position permanently deforming said member beyond its elastic limit.

5. A landing gear comprising first and second elements connected for movement relative to each other between an extended position and a withdrawn position, a ground engaging wheel on one of said elements, a permanently deformable tension member connected between said elements at spaced points, said tension member being substantially unstressed when said elements are in said extended position, means permitting movement of said elements from said withdrawn position to said extended position without deformation of said tension member and movement of said elements from said extended position toward said withdrawn position permanently deforming said tension member beyond its elastic limit.

6. A landing gear comprising first and second elements connected for movement relative to each other between an extended position and a withdrawn position, a ground engaging wheel on one of said elements, a permanently deformable tension member connected between said elements at spaced points, said tension member being substantially unstressed when said elements are in said extended position, means permitting movement of said elements from said withdrawn position to said extended position without deformation of said tension member and movement of said elements from said extended position toward said withdrawn position permanently deforming said tension member beyond its elastic limit, and a spring connected between said elements resiliently resisting movement of said elements to said withdrawn position.

7. A landing gear comprising first and second elements connected for movement relative to each other between an extended position and a withdrawn position, a ground engaging wheel on one of said elements, a permanently deformable tension member connected between said elements at spaced points, said tension member being substantially unstressed when said elements are in said extended position, means permitting movement of said elements from said withdrawn position to said extended position without deformation of said tension member and movement of said elements from said extended position toward said withdrawn position deforming said tension member beyond its elastic limit, a mechanical spring, means connecting said mechanical spring between said elements operable to load said mechanical spring when said elements move toward said withdrawn position beyond a predetermined intermediate position.

8. An aircraft landing gear comprising first and second elements, pivot means connecting said elements for relative movement between an extended position and a withdrawn position, a permanently deformable tension member connected to said first element at a first point and to said second element at a second point spaced from said first point, both of said points being spaced from said pivot means, a ground engaging wheel on said first element spaced from said pivot means by a distance greater than the distance between said first point and pivot means, said tension member being substantially unstressed when said elements are in said extended position, means permitting movement of said elements from said withdrawn position to said extended position without deformation of said tension member and permanently deforming said tension member beyond its elastic limit by movement of said elements to said withdrawn position.

9. An aircraft landing gear comprising first and second elements, pivot means connecting said elements for relative movement between an extended position and a withdrawn position, a permanently deformable tension member connected to said first element at a first point and to said second element at a second point spaced from said first point, both of said points being spaced from said pivot means, a ground engaging wheel on said first element spaced from said pivot means by a distance greater than the distance between said first point and pivot means, said tension member being substantially unstressed when said elements are in said extended position, means permitting movement of said elements from said withdrawn position to said extended position without deformation of said tension member and permanently deforming said tension member beyond its elastic limit by movement of said elements to said withdrawn position, a first spring connected between said elements resiliently resisting movement thereof toward said compressed position beyond an intermediate position, and a second spring resiliently urging said elements toward said extended position.

10. An aircraft landing gear comprising first and second elements, pivot means connecting said elements for relative movement between an extended position and a withdrawn position, a permanently deformable tension member connected to said first element at a first point, a clamp on said second element engaging said tension member at a second point and operable to place said member in tension when said points move apart and release said member when there is no tension therein, both of said points being spaced from said pivot means, a ground engaging wheel on said first element at a point spaced from said pivot means by a distance greater than the distance between said first point and pivot means, said tension member being substantially unstressed when said elements are in said extended position, means permitting movement of said elements from said withdrawn position to said extended position without deformation of said tension member and permanently deforming said tension member beyond its elastic limit by movement of said elements to said withdrawn position.

11. An aircraft landing gear comprising first and second elements, pivot means connecting said elements for relative movement between an extended position and a withdrawn position, a permanently deformable tension member connected to said first element at a first point, clamp means on said second element engaging said tension member at a second point and operating to prevent movement of said member only in a direction toward said first point, both of said points being spaced from said pivot means, a ground engaging wheel on said first element spaced from said pivot means by a distance greater than the distance between said first point and pivot means, said tension member being substantially unstressed when said elements are in said extended position, means permitting movement of said elements from said withdrawn position to said extended position without deformation of said tension member and permanently deforming tension member beyond its elastic limit by movement of said elements to said withdrawn position.

12. An aircraft landing gear comprising a strut adapted to be connected to an aircraft, a first axle beam pivoted on said strut for rotation relative thereto in a vertical plane, a second axle beam pivoted on said strut for rotation relative thereto in said plane, a landing element on each axle beam operable when loaded to rotate said axle beams upwardly relative to said strut, a tension member having elastic limit connected to each of said axle beams at points spaced from the pivot of the associated axle beam on said strut by a distance less than the spacing between each landing element and its associated axle beam pivot on said strut, said upward rotation of said axle beams under the influence of loading of said landing elements stressing said tension member beyond its elastic limit.

13. An aircraft landing gear comprising a strut adapted to be connected to an aircraft, a first axle beam pivoted on said strut for rotation relative thereto in a vertical plane, a second axle beam pivoted on said strut for rotation relative thereto in said plane, a landing element on each axle beam operable when loaded to rotate said axle beams upwardly relative to said strut, a tension member having elastic limit connected between said axle beams at points spaced from the pivot of the associated axle beam on said strut by a distance less than the spacing between each landing element and its associated axle beam pivot on said strut, said upward rotation of said axle beams under the influence of loading of said landing elements stressing said tension member beyond its elastic limit, and a mechanical spring connected between said axle beam resiliently resisting said upward movement only beyond a predetermined position.

14. An aircraft landing gear comprising a strut adapted to be connected to an aircraft, a first axle beam pivoted on said strut for rotation relative thereto in a vertical plane, a second axle beam pivoted on said strut for rotation relative thereto in said plane, a landing element on each axle beam operable when loaded to rotate said axle beams upwardly relative to said strut, a tension member having elastic limit connected between said axle beams at points spaced from the pivot of the associated axle beam on said strut by a distance less than the spacing between each landing element and its associated axle beam pivot on said strut, said upward rotation of said axle beams under the influence of loading of said landing elements stressing said tension member beyond its elastic limit, a first mechanical spring connected between said axle beams resiliently resisting said upward movement only beyond a predetermined position, and second mechanical springs connected between said strut and each axle beam resiliently urging said axle beams downwardly relative to said strut.

15. A landing gear comprising a first element and a second element, means mounting said first element and said second element for movement relatively to each other between an extended position and a withdrawn position of said first element and said second element, a rigid member extending between said first element and said second element, means connecting said rigid member to said first element and to said second element at positions spaced a given distance from each other when said first element and said second element are disposed in said extended position and spaced a distance greater than said given distance when said first element and said second element are disposed in said withdrawn position and applying a tension force to said rigid member and deforming said rigid member by said tension force beyond the elastic limit of said rigid member when said first element and said second element are moved from said extended position to said withdrawn position.

16. A landing gear comprising a first element and a second element, means mounting said first element and said second element for movement relatively to each other between an extended position and a withdrawn position of said first element and said second element, a rigid member extending between said first element and said second element, means connecting said rigid member to said first element and to said second element at positions spaced a given distance from each other when said first element and said second element are disposed in said extended position and spaced a distance greater than said given distance when said first element and said second element are disposed in said withdrawn position, said connecting means including yieldable means co-operating with the rigid member to permit movement of said first element and said second element from said withdrawn position to said extended position and applying a tension force to said rigid member and deforming said rigid member by said tension force beyond the elastic limit of said rigid member when said first element and said second element are moved from said extended position to said withdrawn position.

17. A landing gear comprising a first element and a second element, means mounting said first element and said second element for movement relatively to each other between an extended position and a withdrawn position of said first element and said second element, a rigid member extending between said first element and said second element, means connecting said rigid member to said first element and to said second element at positions spaced a given distance from each other when said first element and said second element are disposed in said extended position and spaced a distance greater than said given distance when said first element and said second element are disposed in said withdrawn position, said connecting means including yieldable means co-operating with said rigid member to permit movement of said first element and said second element from said withdrawn position to said extended position and locking means for engaging and gripping the rigid member to apply a tension force to said rigid member and deforming said rigid member by said tension force beyond the elastic limit of said rigid member when said first element and said second element are moved from said extended position to said withdrawn position.

18. A landing gear comprising a first element and a second element, means mounting said first element for movement relatively to said second element between an extended position and a withdrawn position of said first element, a rigid member extending between said first element and said second element, means connecting said rigid member to said first element and to said second element at positions spaced a given distance from each other when said first element is disposed in said extended position and spaced a distance greater than said given distance when said first element is disposed in said withdrawn position and applying a tension force to said rigid member and deforming said rigid member by said tension force beyond the elastic limit of said rigid member when said first element is moved from said extended position to said withdrawn position.

19. A landing gear comprising a first element and a second element, means mounting said first element for movement relatively to said second element between an extended position and a withdrawn position of said first element, a rigid member extending between said first element and said second element, means connecting said rigid member to said first element and to said second element at positions spaced a given distance from each other when said first element is disposed in said extended position and spaced a distance greater than said given distance when said first element is disposed in withdrawn position, said connecting means including yieldable means co-operating with said rigid member to permit movement of said first element from said withdrawn position to said extended position and applying a tension force to said rigid member and deforming said rigid member by said tension force beyond the elastic limit of said rigid member when said first element is moved from said extended position to said withdrawn position.

References Cited in the file of this patent

UNITED STATES PATENTS

| | | |
|---|---|---|
| Re. 22,255 | Dowty | Jan. 26, 1943 |
| 2,130,914 | Warren | Sept. 20, 1938 |
| 2,274,227 | Willard | Feb. 24, 1942 |
| 2,367,467 | Mercier | Jan. 16, 1945 |
| 2,391,275 | Shaw | Dec. 18, 1945 |
| 2,423,736 | Tack | July 8, 1947 |
| 2,549,942 | Smith | Apr. 24, 1951 |
| 2,682,931 | Young | July 6, 1954 |
| 2,835,348 | Sadtler | May 20, 1958 |

FOREIGN PATENTS

| | | |
|---|---|---|
| 639,383 | Great Britain | June 28, 1950 |